Dec. 8, 1970     J. J. McKINLEY, JR     3,545,931
AMMONIA ANALYSIS SYSTEM

Filed Aug. 28, 1968     2 Sheets-Sheet 1

INVENTOR.
J. J. McKinley
BY
AGENT

Dec. 8, 1970   J. J. McKINLEY, JR   3,545,931
AMMONIA ANALYSIS SYSTEM
Filed Aug. 28, 1968   2 Sheets-Sheet 2

INVENTOR.
J.J. McKinley
BY
AGENT

United States Patent Office 3,545,931
Patented Dec. 8, 1970

3,545,931
AMMONIA ANALYSIS SYSTEM
James J. McKinley, Jr., Texas City, Tex., assignor to Monsanto Company, St. Louis, Mo., a corporation of Delaware
Filed Aug. 28, 1968, Ser. No. 756,039
Int. Cl. G01n 31/06, 1/22, 27/18
U.S. Cl. 23—232   9 Claims

ABSTRACT OF THE DISCLOSURE

A system for the continuous analysis of ammonia in process streams comprising a sample chamber and a permeation chamber, said chambers being separated by a membrane permeable to ammonia, a decomposition means for decomposing ammonia into hydrogen and nitrogen, said decomposition means being in open communication with said permeation chamber and a detecting and measuring means in open communication with said decomposition means for detecting and measuring the hydrogen formed.

BACKGROUND OF THE INVENTION

The present invention relates to the analysis of process streams. More particularly, the present invention relates to a system and method for the continuous analysis of ammonia in a process stream.

Ammonia is an extremely important product of commerce and is found in many chemical processes as, for example, petroleum refinery operations, production of acrylonitrile and fertilizer plants. The analysis of the ammonia content of streams involved in these processes is of the utmost importance for reactor control purposes, yield determinations, etc.

In many techniques utilized for the continuous analysis of ammonia in gas streams, much of the apparatus employed is relatively complicated and the methods time-consuming due to the fact that the gas stream being analyzed generally contains many components which interfere with the ammonia analysis and which have to be separated prior to the determination.

SUMMARY

A system and method for the continuous analysis of ammonia has now been developed which overcomes most of the difficulties previously encountered due to the presence of interfering components in the stream being analyzed. According to the present invention, there is provided a system for the continuous analysis of ammonia in a process stream comprising in combination a permeation chamber having an inlet and an outlet, at least a portion of the wall of said permeation chamber being formed by a membrane permeable by ammonia, a sample chamber having an inlet and an outlet, at least a portion of the wall of said sample chamber also being formed by said membrane, whereby ammonia within said sample chamber may permeate through said membrane into said permeation chamber, a decomposition means having an inlet and an outlet for decomposing ammonia into hydrogen and nitrogen, the inlet of said decomposition means being in gas flow communication with the outlet of said permeation chamber, detection means for detecting and measuring the hydrogen formed from the decomposition of ammonia in said decomposition means, said detection means being in gas flow communication with the outlet of said decomposition means, and means for flowing a carrier gas through said permeation chamber to sweep said ammonia into said decomposition means and to sweep the hydrogen formed in said decomposition means to said detection means.

There is also provided by the present invention a method for the continuous analysis of ammonia in process streams comprising sampling a stream containing ammonia, separating said ammonia from said stream by means of a membrane selectively permeable to ammonia, decomposing the separated ammonia into hydrogen and nitrogen, detecting and measuring the amount of hydrogen formed and employing the hydrogen value to calculate the ammonia content.

DESCRIPTION OF THE DRAWINGS

Reference is now made to FIG. 1 for a detailed description of the present invention. A gas stream containing ammonia enters sample chamber 10 via line 11 and exits via line 12. Sample chamber 10 is separated from permeation chamber 13 by a membrane 14 which is selectively permeable to ammonia. Thus, as sample gas flows through sample chamber 10, the ammonia contained therein will permeate into permeation chamber 13.

A carrier gas from a source (not shown) which can be a cylinder of nitrogen, argon or other carrier gas, flows via line 15 into line 16 and into permeation chamber 13 and sweeps the ammonia which has permeated into chamber 13 from chamber 10 out through line 17 and into decomposition means 18. In the preferred embodiment shown herein, decomposition means 18 is a reactor containing a catalyst which causes dissociation of ammonia into hydrogen and nitrogen. The carrier gas flowing into decomposition means 18 carries the hydrogen formed therein into line 19 and then into detector 20 where the amount of hydrogen is detected and measured. The hydrogen measurement, of course, is directly proportional to the partial pressure of the ammonia in the stream being analyzed; therefore, if the sample pressure is held constant, the ammonia content of the stream will be reflected by the hydrogen measurement. Detector 20 is connected to a suitable recorder means 21 where the amount of ammonia in the gas stream, which is seen as a hydrogen measurement, is continuously indicated. Carrier gas from source 15 is also passed directly to detector 20 via line 35, restrictor valve 23 and line 22 to serve as a reference gas for the purpose of maintaining the detector in balance.

The selectively permeable membranes useful in the present invention are polymeric plastic compositions. The particular membrane chosen must be one having a structure such that the molecules of ammonia may readily permeate the membrane while molecules of the remaining components in the process sample mixture will not. Certain fluoropolymers have been found to be useful in the practice of the present invention. A particularly useful fluoropolymer is polytetrafluoroethylene.

The thickness of the selectively permeable membrane will vary to some extent with the particular membrane chosen, the configuration of the membrane, etc. Generally, the membrane will have a thickness of no greater than 0.1 in. nor less than 0.0001 in. More often, however, the selectively permeable membrane will have a thickness within the range of 0.001 in. to 0.02 in. When polytetrafluoroethylene is used as the permeable membrane, a thickness of from 0.005 in. to 0.015 in. is preferred.

The design of the permeation chamber of the present invention is not critical. However, it is generally desirable to have a high surface area of membrane exposed to the stream to be analyzed, particularly, in relation to the internal cross-sectional area of the chamber through which the carrier gas flows. In view of this consideration, a preferred arrangement of sample chamber and permeation chamber is accomplished by using a helically coiled tubing of a suitable plastic membrane, such as polytetrafluoroethylene, as the permeation chamber suspended in a suitable vessel through which the gas to be analyzed is allowed to flow, i.e., the sample chamber.

Figure 1:
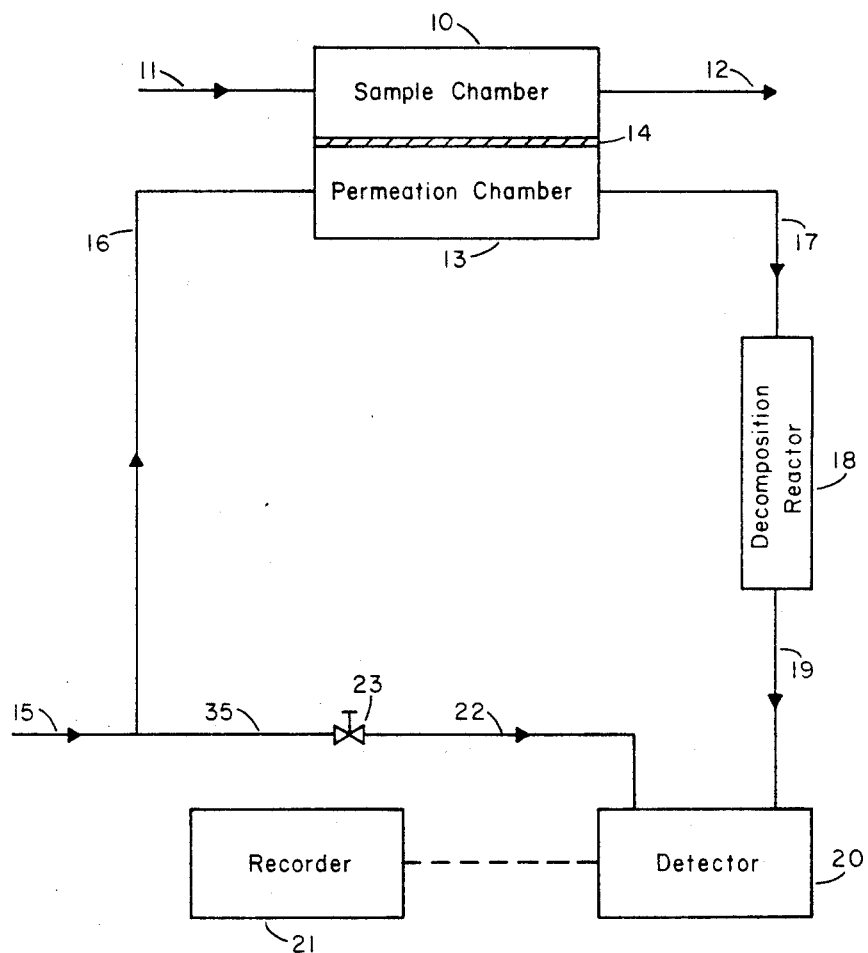
Figure 2:
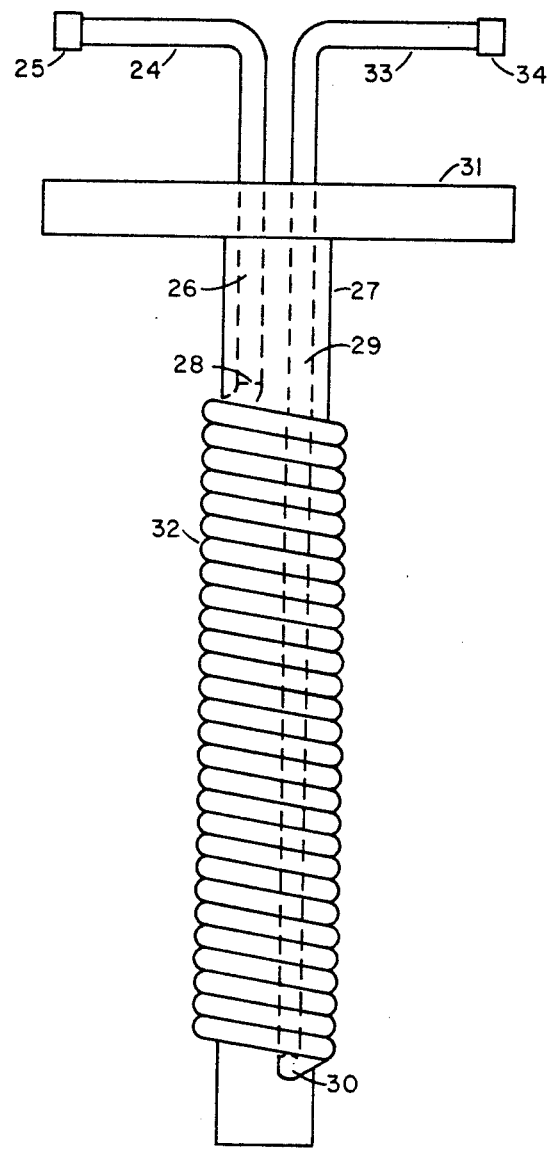

Reference is made to FIG. 2 for a description of an especially desirable design of a permeation chamber. Nonpermeable tubing 24 having open inlet end 25 is adapted for attachment with the carrier gas source (now shown). Tubing 24 is connected to a passageway 26 within support rod 27 having a terminating end 28. Support rod 27 is also provided with another passageway 29 having a terminating end 30. Support rod 27 is mounted through flange 31 for removably attaching the gas sampling device to a sample chamber or conduit (now shown). Selectively permeable tubing 32 is helically wrapped around support rod 27 and connected at one end at terminating end 28 of passageway 26 and at the other end to terminating end 30 of passageway 29. Passageway 29 is connected to tubing 33 having opening 34 for attachment to the ammonia decomposition reactor. In this preferred shape of the permeation chamber, the permeating molecules permeate into the internal passage of the tubing through which the carrier gas is passed. It is desirable that the preferred tubular permeation chamber have a small internal diameter in relation to its length. Tubular permeation chambers having internal diameters of 0.012 to 0.5 in. and a length of 1 to 100 ft. have been found to be useful. An especially useful tubular permeation chamber formed from polytetrafluoroethylene tubing has an internal diameter of from 0.025 to 0.125 in. and a length of from 4 to 15 ft.

The means for decomposing the ammonia can be any means which can be used to break down ammonia into nitrogen and hydrogen such as an ionization means, electric discharge, etc. A preferable decomposition means comprises a reactor containing a catalyst which will decompose ammonia into nitrogen and hydrogen. The particular design and size of the reactor will, of course, depend on the catalyst chosen, the approximate ammonia content of the stream being analyzed, etc. A reactor comprising a 6-inch section of ¼-in. O.D. stainless steel tubing wrapped with nichrome heating tape has been found to work satisfactorily.

The catalyst used in the decomposition reactor can be any of the well known catalysts which are capable of causing rapid and complete dissociation of ammonia into hydrogen and nitrogen. Of these catalysts, a preferred group contains iron oxide as the major constituent promoted with potassium oxide as the next major constituent and contains a minor amount of a stabilizer such as chromium oxide. A dehydrogenation catalyst known commercially as Shell 105 is one of the iron-oxide-based catalysts which has been found to work very satisfactorily. It is necessary in using such catalysts to reduce them in a hydrogen atmosphere prior to use. This reduction can be carried out by heating the catalyst at a temperature of from 300 to 700° C. in a stream of hydrogen for 2 to 8 hours.

The temperature at which the reactor is operated will, of course, vary depending on which particular catalyst is being employed. When one of the preferred iron oxide based, potassium oxide promoted catalysts is used, a temperature of from 580 to 650° C. has been found to be desirable.

Virtually any of the well known carrier gases such as those used in conventional gas chromatographic techniques may be used to carry the ammonia permeating the membrane to the detection and measurement means. Such gases include nitrogen, carbon dioxide, argon, neon, etc. Of course, hydrogen cannot be used as a carrier gas inasmuch as the hydrogen measurement from the decomposition of the ammonia is the basis of the analytical technique employed. Also, helium is preferably not used as a carrier gas because of the difficulty of differentiating between helium and hydrogen in the detection and measurement means and the high permeability of most polymers to helium. The preferred carrier gases have been found to be nitrogen and argon.

The carrier gas flow rate has been found to be of some criticality in the analytical method of the present invention. If the flow rate is too high, the residence time of the ammonia in the decomposition reactor will be too short with the result that incomplete dissociation occurs. When the preferred tubular polytetrafluoroethylene membrane is used and the catalyst in the decomposition reactor is one of the preferred iron oxide-potassium oxide promoted group, a flow rate of the order of 2 to 10 volumes per minute per volume of internal space within the tubular membrane is generally preferred.

The detecting means used can be any suitable detector commonly used for the detection and measurement of hydrogen. Particularly suitable as a detector is a katharometer or thermal conductivity detector.

In cases where the stream to be analyzed contains oxygen as a constituent, it has been found necessary to employ a means for removing the oxygen prior to its introduction into the decomposition reactor. This is because of the deleterious effect which oxygen has on most ammonia decomposition catalysts. A suitable means for the removal of oxygen comprises a small tubular reactor containing a catalyst such as manganese oxide. As in the case of the ammonia decomposition reactor the dimensions of the reactor used for the removal of oxygen are not critical. Reactor lengths from 3 to 12 in. having an inside diameter of from ⅛ to ½ in. and an outside diameter of from ¼ to ¾ in. have been found to work quite well. Catalysts other than manganese oxide may be used as oxygen scavengers in the system; for example, finely-divided copper metal will work satisfactorily. Also, oxygen getters such as those used in vacuum tubes could be used.

What is claimed is:

1. A system for the continuous analysis of ammonia in a process stream comprising in combination:
   a permeation chamber having an inlet and an outlet, at least a portion of the wall of said permeation chamber being formed by a membrane selectively permeable by ammonia,
   a sample chamber having an inlet and an outlet, at least a portion of the wall of said sample chamber also being formed by said membrane, whereby ammonia within said sample chamber may permeate through said membrane into said permeation chamber,
   decomposition means having an inlet and an outlet, for decomposing ammonia into hydrogen and nitrogen, the inlet of said decomposition means being in gas flow communication with the outlet of said permeation chamber,
   detection means for detecting and measuring the hydrogen formed from the decomposition of ammonia in said decomposition means, said detection means being in gas flow communication with the outlet of said decomposition means, and
   means for flowing a carrier gas through said permeation chamber to sweep said ammonia into said decomposition means and to sweep the hydrogen formed in said decomposition means to said detection means.

2. The system of claim 1 wherein said decomposition means comprises a reactor containing a catalyst which decomposes ammonia into hydrogen and nitrogen.

3. The system of claim 2 wherein said membrane is a polymeric plastic composition.

4. The system of claim 3 wherein the polymeric plastic composition is polytetrafluoroethylene.

5. The system of claim 2 wherein said detection means is a katharometer.

6. The system of claim 2 wherein said permeation chamber is formed by tubing of polytetrafluoroethylene.

7. The system of claim 2 wherein said reactor comprises a stainless steel tube wrapped with a Nichrome wire heating source and said catalyst comprises a reduced iron oxide based, potassium oxide promoted catalyst.

8. The apparatus of claim 7 having a means for removing oxygen located between said permeation chamber and said reactor and in gas communication with said permeation chamber and said reactor.

9. A method for the continuous analysis of ammonia in process streams comprising sampling a stream containing ammonia, separating said ammonia from said stream by means of a membrane selectively permeable to ammonia, decomposing the separated ammonia into hydrogen and nitrogen, detecting and measuring the amount of hydrogen formed and employing the hydrogen value to calculate the ammonia content.

References Cited

UNITED STATES PATENTS

| | | | |
|---|---|---|---|
| 2,671,337 | 3/1954 | Hulsberg | 55—158X |
| 2,817,229 | 12/1957 | Beard | 73—26 |
| 3,010,536 | 11/1961 | Plurien et al. | 55—158 |
| 3,371,468 | 3/1968 | Shropshire | 55—158 |

JOSEPH SCOVRONEK, Primary Examiner

E. A. KATZ, Assistant Examiner

U.S. Cl. X.R.

23—196, 254; 55—16, 70